(No Model.)

R. ADAMS.
WHEEL.

No. 299,711. Patented June 3, 1884.

Witnesses.
Jo. L. Coombs
Robert Everett

Inventor,
Robert Adams,
By James L. Norris.
Atty.

N. PETERS. Photo-Lithographer, Washington, D. C.

UNITED STATES PATENT OFFICE.

ROBERT ADAMS, OF SOUTHWARK, COUNTY OF SURREY, ENGLAND.

WHEEL.

SPECIFICATION forming part of Letters Patent No. 299,711, dated June 3, 1884.

Application filed November 6, 1883. (No model.) Patented in England October 16, 1882, No. 4,922.

*To all whom it may concern:*

Be it known that I, ROBERT ADAMS, a subject of the Queen of Great Britain, residing at 7 Great Dover Street, Southwark, in the county of Surrey, England, engineer, have invented certain new and useful Improvements in Means and Appliances for Setting, Tightening, Repairing, and Renewing the Spokes of Velocipede and other Tension Wheels, (for which I have obtained a patent in Great Britain, No. 4,922, bearing date October 16, 1882,) of which the following is a specification.

The object of my said invention is to provide improved means and facilities for setting, tightening, repairing, and renewing the spokes of velocipede and other tension wheels. In order to effect this object, I make and use nuts of a particular form. These nuts are externally plain, and either cylindrical, square, conical, or polygonal. Heads are formed upon the nuts, which heads are made of any convenient form, in order to prevent their turning round in the holes provided for them, and to prevent their being drawn through the holes in which they rest. The heads are also provided with one or more wings, or formed square, polygonal or otherwise; or the nut itself may be so formed and have a cylindrical or otherwise formed head, with or without burrs or nibs. Suitable holes are formed for these nuts to fit into, either in the hub or felly of the wheel, as may be required according to the construction of the wheel or the use to which it may be applied. A hole is drilled longitudinally through the nut of the requisite size for the spoke, such hole being tapped with a screw-thread to fit that of the spoke. One head of the spoke has the usual rivet-head formed upon it, the other end being tapped with a screw-thread to fit that of the nut.

In order to tighten up, release, or renew a spoke, the nut is placed in its hole and the end of the spoke inserted therein. The spoke is then forcibly turned in its place until it is screwed to a sufficient state of tension.

In case of the breaking of one or more spokes, the old nut can be quickly removed and a new spoke inserted with very little delay, and in case of a spoke becoming accidentally bent it can in like manner be removed, straightened, and replaced. These nuts are sometimes applied to both ends of the spokes with a right-and-left-hand screw, in which case it is obvious that no rivet-head is required to be formed at either end of the spokes; and in order that my said invention may be more fully understood, reference is made to the accompanying drawings, in which similar letters of reference indicate corresponding parts in the several figures.

Figure 1:
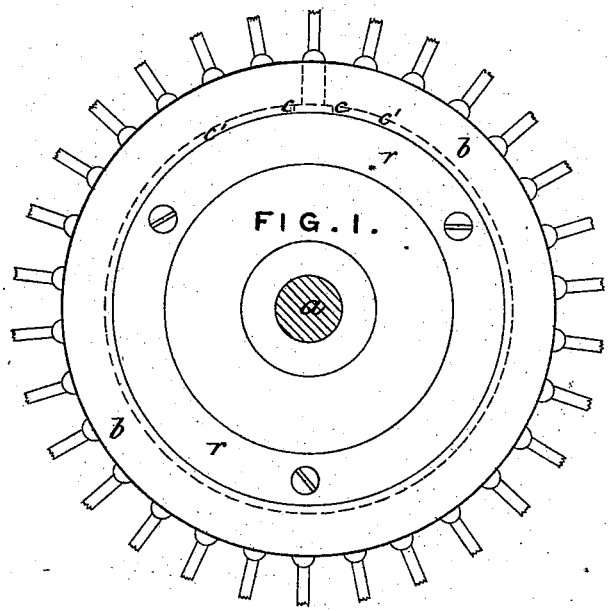
Figure 1 is a front view of one of the disks fixed to the center of the wheel. $a$ is the axle. $b$ is that part of the disk which is perforated for the nuts and ends of the spokes. $r$ is the covering-ring, which is sometimes fitted to cover the internal ends of the nuts.
Figure 2:
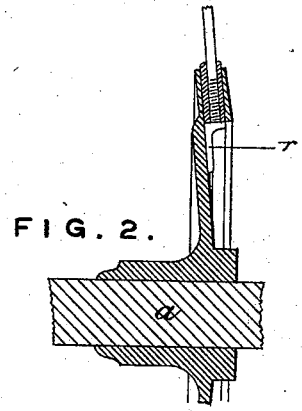
Fig. 2 is a section of a portion of Fig. 1, with the nut and a portion of a spoke in position.
Figures 3, 4:
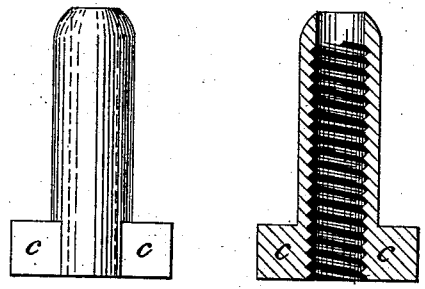
Figure 5:
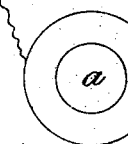

Fig. 3 is an enlarged view of the nut detached. Fig. 4 is a section of the same, and Fig. 5 a plan of the same. $c\ c$ are the wings to prevent the nut from turning when in position. These wings are held in the groove $c'$, Fig. 1.

Figure 6:
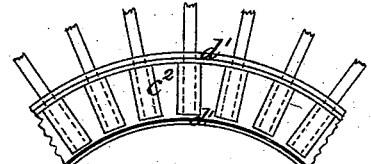

Fig. 6 is a view of a portion of the disk, showing another arrangement, in which the nuts are made square and of such a length as to fit between the projections $d'\ d'$.

Figures 7, 8:
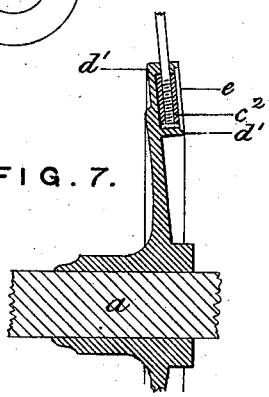

Fig. 7 is a section of the same. $e$ is a covering plate or ring, which is screwed thereto to hide the nuts and keep out dust, &c.

Fig. 8 is a section showing another mode of forming the provision for square nuts and another form of covering-plate for the same. $e$ is the covering-plate, which is screwed to the disk, as before. This covering-plate is in some cases screwed into a circular flange with a male and female screw, or by pins through the outer flange.

Having thus particularly described and ascertained the nature of my said invention and the manner in which the same is to be performed, I claim—

1. In a vehicle-wheel, the internally-threaded nut held in a stationary position in the disk of the hub, in combination with the spoke having a screw-threaded end adapted to the internal thread of the nut for tightening and repairing the spokes, substantially as described.

2. In a vehicle-wheel, the combination of the disk having an annular rim provided with perforations to receive the ends of the spokes, with the internally-threaded nuts applied to the rim and held against rotation, and the spokes having screw-threaded ends passing through the rim of the disk and screwed into the nuts, substantially as described.

3. The combination, in a vehicle-wheel, of the disk, the internally-threaded nuts held against rotation around the periphery of the nuts, the spokes having screw-threaded ends screwed into the nuts, and an annular covering-plate arranged over the inner ends of the nuts, substantially as described.

4. The combination, with the central disk of a vehicle-wheel having an annular grooved rim, of the internally-threaded nuts arranged in the groove, and provided with wings $e$ to prevent their rotation, and the spokes having screw-threaded ends screwed into the nuts, substantially as described.

5. The combination, in a vehicle-wheel, of the center disk, the detachable internally-threaded nuts held against rotation around the periphery of the disk, and the wheel-spokes having screw-threaded ends screwed into the nuts, substantially as described.

In testimony whereof I have hereto set my hand this 20th day of September, 1883.

ROBERT ADAMS.

Witnesses:
JOHN DEAN,
   17 Gracechurch Street, London.
GEO. C. DOWNING,
   8 Quality Ct., London.